(12) United States Patent
Uno (10) Patent No.: US 12,197,111 B2
(45) Date of Patent: Jan. 14, 2025

(54) CAMERA ACTUATOR

(71) Applicant: BEIJING XIAOMI MOBILE SOFTWARE CO., LTD., Beijing (CN)

(72) Inventor: Masaru Uno, Tokyo (JP)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/908,232

(22) PCT Filed: Apr. 14, 2021

(86) PCT No.: PCT/CN2021/087302
§ 371 (c)(1),
(2) Date: Aug. 30, 2022

(87) PCT Pub. No.: WO2022/217512
PCT Pub. Date: Oct. 20, 2022

(65) Prior Publication Data
US 2023/0375900 A1 Nov. 23, 2023

(51) Int. Cl.
*G03B 17/12* (2021.01)
*G02B 7/08* (2021.01)
(Continued)

(52) U.S. Cl.
CPC ............. *G03B 17/12* (2013.01); *G02B 7/08* (2013.01); *H04N 23/687* (2023.01); *H04N 23/69* (2023.01)

(58) Field of Classification Search
USPC .................. 396/52, 55, 535, 544; 348/208.99
See application file for complete search history.

(56) References Cited

U.S. PATENT DOCUMENTS 7,129,621 B2 * 10/2006 Sakano .................. H02N 2/004
396/113
7,804,645 B2  9/2010 Morita et al.
(Continued)

FOREIGN PATENT DOCUMENTS

CN 101138236 A 3/2008
CN 101373936 A 2/2009
(Continued)

OTHER PUBLICATIONS

First Office Action issued to Japanese Application No. 2021-531254 dated Jun. 23, 2023 with English translation, (6p).
(Continued)

*Primary Examiner* — Clayton E. LaBalle
*Assistant Examiner* — Warren K Fenwick
(74) *Attorney, Agent, or Firm* — Arch & Lake LLP (57) ABSTRACT

Provided is a camera actuator including a fixing frame, a first moving frame movable in a first direction, a second moving frame movable in a second direction orthogonal to the first direction, a lens unit movable in a third direction orthogonal to the first direction and the second direction, a first driver moving the first moving frame in the first direction, a second driver moving the second moving frame in the second direction, and a third driver moving the lens unit in a third direction. Further, the third driver includes a driving source portion formed by a first piezoelectric element and a second piezoelectric element lengthened and shortened by energization and attached to each other in a direction orthogonal to a lengthening-and-shortening direction, and an abutting portion abutting against the lens unit and moving in an elliptical trajectory according to deformation of the driving source portion.

20 Claims, 3 Drawing Sheets

(51) Int. Cl.
*H04N 23/68* (2023.01)
*H04N 23/69* (2023.01)

(56) References Cited

U.S. PATENT DOCUMENTS

| | | | |
|---|---|---|---|
| 7,973,822 B2 | 7/2011 | Kawai et al. | |
| 8,693,116 B2 * | 4/2014 | Kuwano | H02N 2/001 |
| | | | 359/824 |
| 9,154,053 B2 * | 10/2015 | Kuwano | G02B 7/08 |
| 10,122,923 B2 | 11/2018 | Jung et al. | |
| 2004/0178699 A1 * | 9/2004 | Nakanishi | H02N 2/0025 |
| | | | 310/323.01 |
| 2009/0002500 A1 * | 1/2009 | Kawai | H10N 30/2023 |
| | | | 348/208.11 |
| 2009/0002825 A1 | 1/2009 | Morita et al. | |
| 2009/0003812 A1 | 1/2009 | Kawai | |
| 2009/0262232 A1 | 10/2009 | Kim et al. | |
| 2010/0284098 A1 * | 11/2010 | Kuwano | H02N 2/101 |
| | | | 310/323.06 |
| 2018/0115715 A1 | 4/2018 | Jung et al. | |
| 2019/0346740 A1 | 11/2019 | Suh et al. | |

FOREIGN PATENT DOCUMENTS

| | | | | | |
|---|---|---|---|---|---|
| CN | 102447416 A | * | 5/2012 | | G02B 7/04 |
| CN | 107966868 A | | 4/2018 | | |
| JP | 2004159425 A | * | 6/2004 | | |
| JP | 2004166479 A | * | 6/2004 | | H01L 41/0913 |
| JP | 2004266943 A | * | 9/2004 | | G02B 26/02 |
| JP | 2004274916 A | * | 9/2004 | | H02N 2/0025 |
| JP | 2004312814 A | * | 11/2004 | | |
| JP | 2006081348 A | | 3/2006 | | |
| JP | 2009033837 A | * | 2/2009 | | G03B 3/10 |
| JP | 20009042551 A | | 2/2009 | | |
| JP | 2015084035 A | | 4/2015 | | |

OTHER PUBLICATIONS

Extended European Search Report of EP Application No. 21927041.0 dated Mar. 31, 2023, (10p).

* cited by examiner

CAMERA ACTUATOR

CROSS-REFERENCE TO RELATED APPLICATION

The application is the national phase application of International Application No. PCT/CN2021/087302, filed on Apr. 14, 2021, the entire contents of which are incorporated herein by reference for all purposes.

BACKGROUND

In the related art, for example, JP2012058762A describes a camera lens holder driver. The camera lens holder driver has an automatic focusing region and a jitter correction region containing the automatic focusing region. A camera lens holder with a coil, four magnets, and two leaf springs are arranged in the automatic focusing region. A base substrate, four cables, and four substrates with coils are arranged in the jitter correction region.

SUMMARY

The present disclosure relates to a camera actuator that is applied to a camera module carried by an electronic device (an information device) such as a smart phone. The actuator has an automatic focusing function and is configured to move a camera lens to correct jitters.

According to a first aspect of the present disclosure, a camera actuator is provided. The camera actuator includes: a fixing frame; a first moving frame supported by the fixing frame on an inner side of the fixing frame, and movable relative to the fixing frame in a first direction; a second moving frame supported by the first moving frame on an inner side of the first moving frame, and movable relative to the first moving frame in a second direction orthogonal to the first direction; a lens unit supported by the second moving frame on an inner side of the second moving frame, and movable relative to the second moving frame in a third direction orthogonal to the first direction and the second direction; a first driver extending across the fixing frame and the first moving frame and having a piezoelectric element lengthened and shortened by energization to move the first moving frame in the first direction; a second driver extending across the first moving frame and the second moving frame and having a piezoelectric element lengthened and shortened by energization to move the second moving frame in the second direction; and a third driver fixed on the second moving frame and moving the lens unit in the third direction. The third driver includes: a driving source portion formed by a first piezoelectric element and a second piezoelectric element that are lengthened and shortened by energization and attached to each other in a direction orthogonal to a lengthening-and-shortening direction; and an abutting portion abutting against the lens unit and moving in a manner of drawing an elliptical trajectory according to deformation of the driving source portion.

According to a second aspect of the present disclosure, a camera module is provided. The camera module may include a camera actuator that includes a fixing frame, a first moving frame, a second moving frame, a lens unit, a first driver, a second driver, and a third driver. The first moving frame is supported by the fixing frame on an inner side of the fixing frame, and is movable relative to the fixing frame in a first direction. The second moving frame is supported by the first moving frame on an inner side of the first moving frame, and is movable relative to the first moving frame in a second direction orthogonal to the first direction. The lens unit is supported by the second moving frame on an inner side of the second moving frame, and is movable relative to the second moving frame in a third direction orthogonal to the first direction and the second direction. The first driver extends across the fixing frame and the first moving frame and has a piezoelectric element lengthened and shortened by energization to move the first moving frame in the first direction. The second driver extends across the first moving frame and the second moving frame and has a piezoelectric element lengthened and shortened by energization to move the second moving frame in the second direction. The third driver is fixed on the second moving frame and moves the lens unit in the third direction. The third driver includes: a driving source portion formed by a first piezoelectric element and a second piezoelectric element that are lengthened and shortened by energization and attached to each other in a direction orthogonal to a lengthening-and-shortening direction; and an abutting portion abutting against the lens unit and moving in a manner of drawing an elliptical trajectory according to deformation of the driving source portion.

According to a second aspect of the present disclosure, an electronic device is provided. The electronic device includes a camera actuator that includes a fixing frame, a first moving frame, a second moving frame, a lens unit, a first driver, a second driver, and a third driver. The fixing frame, the first moving frame, and the second moving frame are in an embedded configuration. The first moving frame is movable relative to the fixing frame in a first direction. The second moving frame is movable relative to the first moving frame in a second direction orthogonal to the first direction. The lens unit is supported by the second moving frame on an inner side of the second moving frame, and is movable relative to the second moving frame in a third direction orthogonal to the first direction and the second direction. The first driver extends across the fixing frame and the first moving frame and has a piezoelectric element lengthened and shortened by energization to move the first moving frame in the first direction. The second driver extends across the first moving frame and the second moving frame and has a piezoelectric element lengthened and shortened by energization to move the second moving frame in the second direction. The third driver is fixed on the second moving frame and moves the lens unit in the third direction. The third driver includes: a driving source portion formed by a first piezoelectric element and a second piezoelectric element that are lengthened and shortened by energization and attached to each other in a direction orthogonal to a lengthening-and-shortening direction; and an abutting portion abutting against the lens unit and moving in a manner of drawing an elliptical trajectory according to deformation of the driving source portion.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Terms used in the disclosure are only adopted for the purpose of describing specific embodiments and not intended to limit the disclosure. "A/an", "said" and "the" in a singular form in the disclosure and the appended claims are also intended to include a plural form, unless other meanings are clearly denoted throughout the disclosure. It is also to be understood that term "and/or" used in the disclosure refers to and includes one or any or all possible combinations of multiple associated items that are listed.

It is to be understood that, although terms first, second, third and the like may be adopted to describe various information in the disclosure, the information should not be limited to these terms. These terms are only adopted to distinguish the information of the same type. For example, without departing from the scope of the disclosure, first information may also be called second information and, and similarly, second information may also be called first information. For example, the term "if" used here may be explained as "while" or "when" or "responsive to determining", which depends on the context.

Since the automatic focusing region in the related art has a structure held by two leaf springs, resonance is easily caused. In addition, the automatic focusing region and the jitter correction region are maintained by four cables therebetween, so the jitter correction region is also prone to resonance. Moreover, in the related art, since a coil for jitter correction needs to be arranged adjacent to magnets of the automatic focusing region, the camera lens holder driver must have a large dimension.

In view of the above, the present disclosure aims to provide a small camera actuator having an automatic focusing function and a jitter correction function.

A camera actuator 1 according to an embodiment of the present disclosure is described with reference to accompanying drawings. In addition, the drawings are schematic, and the relationship between illustrations of the drawings may sometimes be inaccurate and mismatched.

Figure 1:
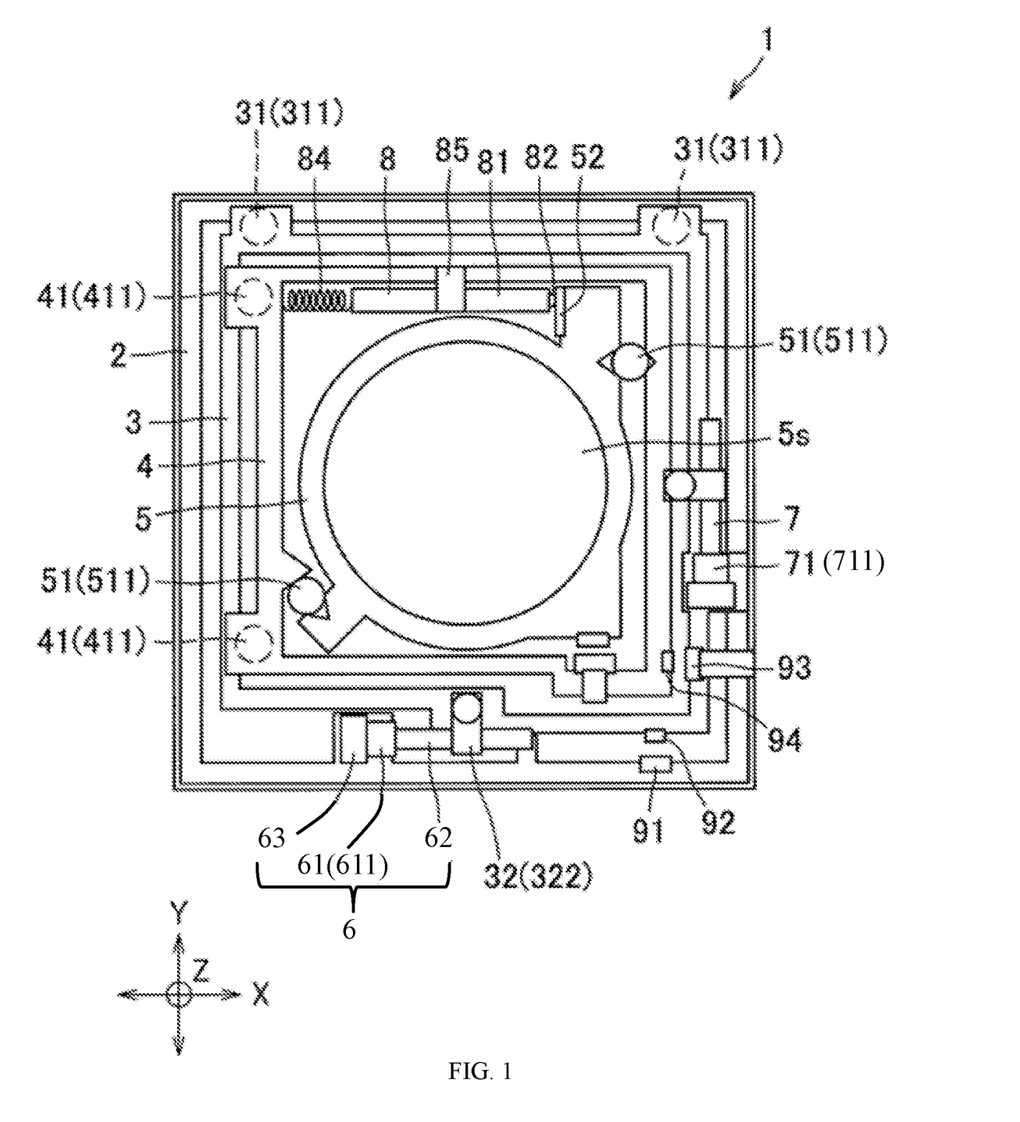
FIG. 1 is a schematic diagram of a structure of a camera actuator according to an embodiment of the present disclosure in a front view.

The camera actuator 1 of this embodiment is applied to a camera module carried by an electronic device (an information device) such as a smart phone. The camera actuator 1 has an automatic focusing function, and is configured to correct a phenomenon of image blurring caused by jitters (i.e., vibrations) transmitted to the information device, by moving an optical axis of a camera according to the vibrations, when a user takes a still image or a video with the information device held by hand, so as to obtain a clear image. As shown in FIG. 1, the camera actuator 1 of this embodiment mainly includes a fixing frame 2, a first moving frame 3, a second moving frame 4, a lens unit 5, a first driver 6, a second driver 7, and a third driver 8. The fixing frame 2, the first moving frame 3, and the second moving frame 4 are arranged in sequence from an outer side to an inner side in a front view. That is, the fixing frame 2, the first moving frame 3, and the second moving frame 4 are arranged in an "embedded" configuration in a common plane. The fixing frame 2, the first moving frame 3, and the second moving frame 4 are polygonal in the front view. Specifically, as shown in FIG. 1, they are roughly square in the front view. However, the present disclosure is not limited thereto. The frames may be roughly rectangular or in other shapes, as long as the first moving frame 3 is movable relative to the fixing frame 2 and the second moving frame 4 is movable relative to the first moving frame 3. In addition, depth dimensions (dimensions in a direction orthogonal to a paper surface of FIG. 1) of the fixing frame 2, the first moving frame 3, and the second moving frame 4 are dimensions that can support balls 311, 411 and 511 in a rotatable manner.

The fixing frame 2 constitutes an outer frame of the camera actuator 1 and is fixed on other parts in the information device such as the smart phone.

The first moving frame 3 is supported by the fixing frame 2 on an inner side of the fixing frame 2 and is movable relative to the fixing frame 2 in a first direction. When the first moving frame 3 moves in the first direction, the second moving frame 4 and the lens unit 5 on an inner side of the first moving frame 3 also move in the first direction. The first direction is an X direction shown in FIG. 1 (a left-right direction shown in the figure) in this embodiment and is one of moving directions for correcting jitters of the lens unit 5. In order to move the first moving frame 3 relative to the fixing frame 2, a first rolling body 31 capable of rolling is held between the first moving frame 3 and the fixing frame 2. In this embodiment, as the first rolling body 31, two balls 311 are on one side (an upper side in FIG. 1) of the first moving frame 3 that is roughly square. The balls 311 are configured to roll while they are held within a predetermined range between the first moving frame 3 and the fixing frame 2. Only the first driver 6 described later is on another side (a lower side in FIG. 1) of the first moving frame 3. However, the present disclosure is not limited thereto, and the first rolling body 31 may also be on the other side.

The second moving frame 4 is supported by the first moving frame 3 on an inner side of the first moving frame 3 and is movable relative to the first moving frame 3 in a second direction orthogonal to the first direction. When the second moving frame 4 moves in the second direction, the lens unit 5 on an inner side of the second moving frame 4 also moves in the second direction. The second direction is a Y direction shown in FIG. 1 (an up-down direction shown in the figure) in this embodiment, and is one of the moving directions for correcting jitters of the lens unit 5. In order to move the second moving frame 4 relative to the first moving frame 3, a second rolling body 41 capable of rolling is held between the second moving frame 4 and the first moving frame 3. In this embodiment, as the second rolling body 41, two balls 411 are on one side (a left side in FIG. 1) of the second moving frame 4 that is roughly square. The balls 411 roll while they are held within a predetermined range between the second moving frame 4 and the first moving frame 3. Only the second driver 7 described later is on another side (a right side in FIG. 1) of the second moving frame 4. However, the present disclosure is not limited thereto, and the second rolling body 41 may also be on the other side. In addition, the third driver 8 for moving the lens unit 5 is on an upper inner side of the second moving frame 4 in FIG. 1 and will be described later.

The lens unit 5 is supported by the second moving frame 4 on the inner side of the second moving frame 4. The lens unit 5 has a roughly cylindrical internal space 5s, and a camera lens is in the internal space 5s. In addition, an optical structure of the lens unit 5 per se is known. The lens unit 5 is movable relative to the second moving frame 4 in a third direction orthogonal to the first direction and the second direction. The third direction is a Z direction shown in FIG. 1 (a direction orthogonal to the paper surface of FIG. 1) in this embodiment, and is a moving direction of the lens unit 5 for the automatic focusing function. In addition, an optical axis direction of the lens unit 5 is in the same direction as the third direction. In order to move the lens unit 5 relative to the second moving frame 4, a third rolling body 51 capable of rolling is held between the lens unit 5 and the second moving frame 4. In this embodiment, as the third rolling body 51, two balls 511 are set as a group, with one ball on one side (a lower left side in FIG. 1) of the second moving frame 4 that is roughly square and the other ball on another side (an upper right side in FIG. 1) of the second moving frame 4 that is roughly square. The balls 511 are configured to roll while they are held within a predetermined range between the second moving frame 4 and the lens unit 5.

The third rolling body 51 is at a position closer to an end side than a center of an edge of the roughly square second moving frame 4. In this embodiment, one ball 511 on the left side in FIG. 1 is at a position closer to a lower end side than a center of a left edge of the second moving frame 4 in the up-down direction, and the other ball 511 on the right side in FIG. 1 is at a position closer to an upper end side than a center of a right edge of the second moving frame 4 in the up-down direction. In addition, the balls 511 in one group as the third rolling body 51 are at symmetrical positions formed by 180° rotation in the second moving frame 4 in the front view. By positioning the third rolling body 51 in this way, a structure for moving the lens unit 5 in the third direction becomes compact.

The first driver 6 extends across the fixing frame 2 and the first moving frame 3 and generates a driving force to move the first moving frame 3 in the first direction. The second driver 7 extends across the first moving frame 3 and the second moving frame 4 and generates a driving force to move the second moving frame 4 in the second direction.

Figure 2:
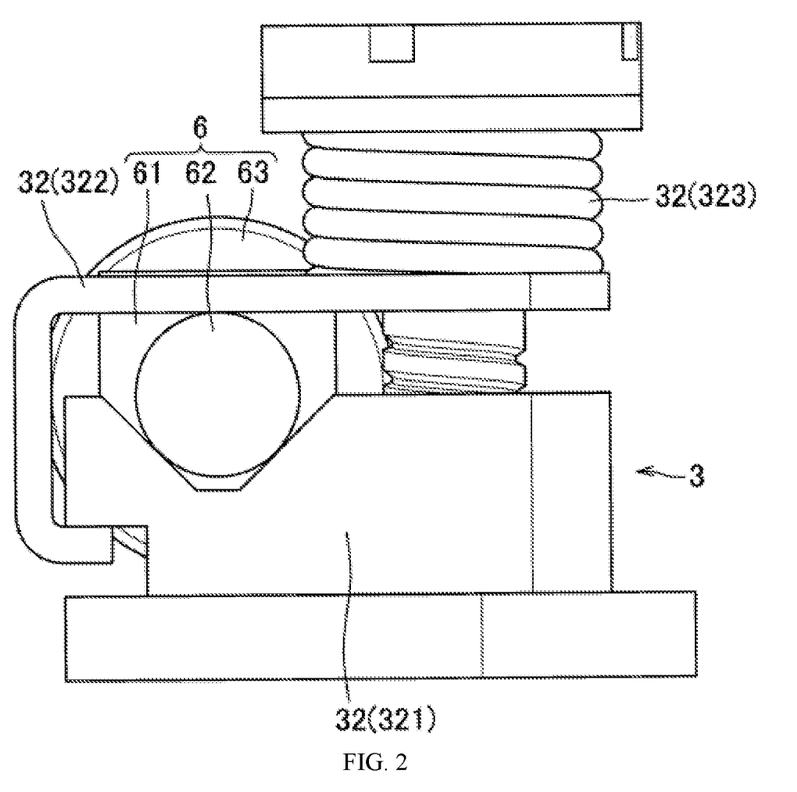
FIG. 2 is a diagram showing a relationship between a first driver and a driving force transmission portion on a first moving frame in a camera actuator, viewed from an end side of a rod-shaped portion of a first driver along an axis direction.

The first driver 6 and the second driver 7 have the same structure. Therefore, the first driver 6 is described as an example. As shown in FIGS. 1 and 2, the first driver 6 integrally includes: a driving force generating portion 61; a rod-shaped portion 62 adjacent to one side of a lengthening-and-shortening direction of a piezoelectric element 611 of the driving force generating portion 61 and extending along the lengthening-and-shortening direction; and a weight portion 63 adjacent to the other side of the lengthening-and-shortening direction of the driving force generating portion 61. In an example shown in FIG. 1, with the driving force generating portion 61 as a reference, the rod-shaped portion 62 is on one side (the right side in the figure) of a length direction, and the weight portion 63 is on the other side (the left side in the figure) of the length direction. As described later, the rod-shaped portion 62 is configured to transmit a force generated by the driving force generating portion 61 to the first moving frame 3. The weight portion 63 is a portion having a greater mass than the rod-shaped portion 62 and is configured to realize a balance with a force of the rod-shaped portion 62. For example, the rod-shaped portion 62 is made of aluminum oxide (density of 3.9), and in this embodiment, the rod-shaped portion 62 has a diameter of 0.7 mm and a length of 4 mm. For example, the weight portion 63 is made of brass (C3602) that is convenient for processing. In this embodiment, the weight portion 63 has a diameter of 1.5 mm and a length of 1.25 mm. In addition, the materials and sizes of the rod-shaped portion 62 and the weight portion 63 are not limited thereto. It should be noted that a piezoelectric element or a piezoelectric device refers to a component that produces a voltage by applying a force or pressure (i.e., a piezoelectric effect) or, conversely, produces deformation by applying a voltage (i.e., an inverse piezoelectric effect), and may be made of materials such as single crystals, ceramics, thin films, etc.

The driving force generating portion 61 includes one piezoelectric element 611 that is lengthened and shortened by energization. The piezoelectric element 611 may be lengthened or shortened by changing an energizing direction of the piezoelectric element 611. The piezoelectric element 611 of this embodiment is lengthened under an applied positive voltage and is shortened under an applied negative voltage. In the driving force generating portion 61, the piezoelectric element 611 is a source of the driving force. In the example shown in FIG. 1, the piezoelectric element 611 is lengthened and shortened in the left-right direction. When the piezoelectric element 611 is lengthened, a force moving towards a direction of the rod-shaped portion 62 (a force towards the right direction in the figure) is generated, and the rod-shaped portion 62 is subjected to a pushing force from the driving force generating portion 61. When the piezoelectric element 611 is shortened, a force moving towards a direction of the weight portion 63 (a force towards the left direction in the figure) is generated, and the rod-shaped portion 62 is subjected to a pulling force from the driving force generating portion 61. Accordingly, by controlling the energizing direction of the piezoelectric element 611 (specifically, the applied positive or negative voltage), a direction of the force (i.e., the force that moves the first moving frame 3 to one side or the other side of the first direction (the X direction)) received by the rod-shaped portion 62 can be changed.

As shown in FIG. 2, a peripheral surface of the rod-shaped portion 62 abuts against a driving force transmission portion 32 on the first moving frame 3. The driving force transmission portion 32 in this embodiment includes a bearing portion 321 having a V-shaped groove (the shape of the groove is not limited thereto) and a plate-shaped pushing portion 322 loaded by a spring 323. That is, as shown in FIGS. 1 and 2, the rod-shaped portion 62 pushes the driving force transmission portion 32 on a frame (the first moving frame 3 in the first driver 6 of this embodiment) on a second side opposite to a first side with the driving force generating portion 61 fixed, through a force exerted by the spring. The rod-shaped portion 62 and the driving force transmission portion 32 are not fixed with each other, but abut against each other by application of friction. Therefore, the driving force transmission portion 32 may be offset along the length direction of the rod-shaped portion 62. Specifically, when a moving speed of the rod-shaped portion 62 is large (when the rod-shaped portion 62 moves rapidly), an offset occurs between the rod-shaped portion 62 and the driving force transmission portion 32. A force generated by the lengthening of the piezoelectric element 611 is transmitted to the driving force transmission portion 32 via the rod-shaped portion 62. In detail, when the piezoelectric element 611 is lengthened slowly (at a slow speed) by energizing the piezoelectric element 611, the rod-shaped portion 62 is linked to the driving force transmission portion 32 without offset, and the force is transmitted to the first moving frame 3 through the driving force transmission portion 32. Hence, the first moving frame 3 can move integrally relative to the first driver 6. Then, when the piezoelectric element 611 is shortened rapidly, a sharp action of the driving force transmission portion 32 relative to the rod-shaped portion 62 is retained by the law of inertia. As a result, the rod-shaped portion 62 is offset from and not linked to the driving force transmission portion 32, and a force generated by the shortening of the piezoelectric element 611 is not transmitted to the driving force transmission portion 32 via the rod-shaped portion 62 (strictly speaking, only very little is transmitted). The driving force transmission portion 32 is movable towards one side (the right direction in FIG. 1) of the lengthening-and-shortening direction of the piezoelectric element 611 by repeating the slow lengthening and rapid shortening of the piezoelectric element 611. In contrast to the above, the driving force transmission portion 32 is movable towards the opposite side (the left direction in FIG. 1) of the lengthening-and-shortening direction by repeating the slow shortening and rapid lengthening of the piezoelectric element 611. In this way, slow and rapid form changes of the piezoelectric element 611 are repeated many times, and a discontinuous force towards one direction is applied to the first moving frame 3. Therefore, with the repetition, the first moving frame 3 can be moved by a desired distance in the first direction (the X direction).

A control portion that energizes the driving force generating portion 61 controls the energization, so that the piezoelectric element 611 can undergo the slow and rapid form changes. The control portion may be provided by the camera actuator 1 itself or by a control section on a main body side of the information device. Specifically, the control portion energizes a voltage applied to the driving force generating portion 61 at a different change rate corresponding to a speed at which the piezoelectric element 611 undergoes the form change. In more detail, a value of the voltage applied to the piezoelectric element 611 increases linearly (simple linear) with the passage of time when the piezoelectric element 611 is lengthened; and the value of the voltage applied to the piezoelectric element 611 decreases linearly (simple linear) with the passage of time when the piezoelectric element 611 is shortened. A change rate of a decreased voltage per predetermined time during the rapid shortening of the piezoelectric element 611 is larger than a change rate of an increased voltage per predetermined time during the slow lengthening of the piezoelectric element 611. That is, an ascent angle of a line (a simple line) of the increased voltage during the slow lengthening of the piezoelectric element 611 is small, and a descent angle of a line (simple linear) of the decreased voltage during the rapid shortening of the piezoelectric element 611 is large. When the driving force transmission portion 32 moves towards one side (the right direction in FIG. 1) of the lengthening-and-shortening direction of the piezoelectric element 611, a plurality of cycles are continuously performed, in which one cycle includes a voltage rise (changing from 0 to a positive predetermined value), a voltage decline (changing from the positive predetermined value to a negative predetermined value), and another voltage rise (changing from the negative predetermined value to 0). In addition, when the driving force transmission portion 32 moves towards the opposite side (the left direction in FIG. 1) of the lengthening-and-shortening direction, one cycle includes a voltage decline (changing from 0 to a negative predetermined value), a voltage rise (changing from the negative predetermined value to a positive predetermined value), and another voltage decline (changing from the positive predetermined value to 0). In this embodiment, a reciprocal of the cycle (i.e., a frequency) is set to 270 kHZ, but the frequency is not limited thereto and may be set freely.

The first driver 6 is described above, and the second driver 7 has the same function. By energizing a piezoelectric element 711 of a driving force generating portion 71 of the second driver 7 in the same way as the first driver 6, the second moving frame 4 is movable in the second direction (the Y direction) relative to the second driver 7.

A position of the first moving frame 3 relative to the fixing frame 2 in the first direction (the X direction) may be for example detected by a Hall element 91 on one side and a permanent magnet 92 on another side. In addition, a position of the second moving frame 4 relative to the fixing frame 2 in the second direction (the Y direction) may be for example detected by a Hall element 93 on one side and a permanent magnet 94 on another side.

In addition, in this embodiment, the driving force generating portion 61 of the first driver 6 is fixed on the fixing frame 2. However, the present disclosure is not limited thereto, and the driving force generating portion 61 may be fixed on the first moving frame 3. In this case, the first driver 6 moves as a whole. Similarly, in this embodiment, the driving force generating portion 71 of the second driver 7 is fixed on the first moving frame 3. However, the present disclosure is not limited thereto, and the driving force generating portion 71 may be fixed on the second moving frame 4.

Next, the third driver 8 will be described. The third driver 8 is fixed on the second moving frame 4, and move the lens unit 5 in the third direction (the Z direction). The third driver 8 extends along an edge of a polygonal shape (specifically, a roughly square shape) in the second moving frame 4. In addition, the third driver 8 is along the edge of the polygonal shape in the second moving frame 4, and the edge is neither an edge close to the first driver 6 (a lower edge in FIG. 1) nor an edge close to the second driver 7 (a right edge in FIG. 1). Specifically, the third driver 8 is along an upper edge in FIG. 1. Since the third driver 8 may be at an unoccupied position where the first driver 6 and the second driver 7 do not exist, the camera actuator 1 becomes compact. The third driver 8 includes a driving source portion 81 and an abutting portion 82. The driving source portion 81 is formed by a first piezoelectric element 811 and a second piezoelectric element 812 that are lengthened by energization and are attached to each other in a direction orthogonal to a lengthening direction. The abutting portion 82 abuts against the lens unit 5 and moves in a manner of drawing elliptical trajectories V1 and V2 according to deformation of the driving source portion 81.

Figure 3:
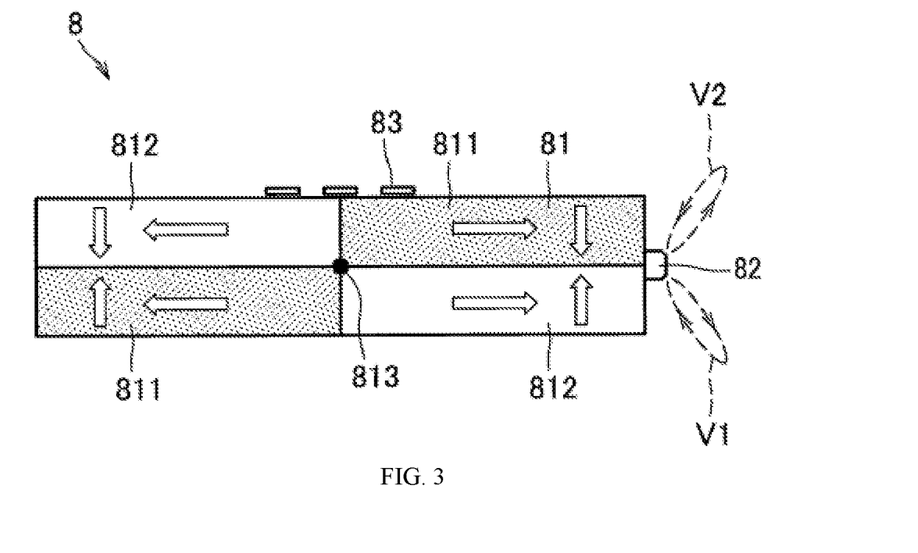
FIG. 3 is a schematic diagram showing a structure and an action of a third driver in a camera actuator.

FIG. 3 schematically shows a structure and an action of the third driver 8. An up-down direction in FIG. 3 corresponds to a front-rear direction orthogonal to the paper surface of FIG. 1. The third driver 8 has the driving source portion 81 and the abutting portion 82. Three protrusions on an upper end edge of the third driver 8 in the figure are electrodes 83 for energizing the piezoelectric elements 811 and 812. The third driver 8 has a support spring 84 at a position (the left side in FIG. 1) opposite to the abutting portion 82, and a force is exerted by the support spring 84 to push the abutting portion 82 to a pushed portion 52 of the lens unit 5.

The driving source portion 81 is formed by the first piezoelectric element 811 and the second piezoelectric element 812 that are lengthened by energization and are attached to each other in the direction orthogonal to the lengthening direction. The first piezoelectric element 811 and the second piezoelectric element 812 are in a diagonal direction, and the driving source portion 81 includes two first piezoelectric elements 811 and two second piezoelectric elements 812. In this embodiment, since the driving source portion 81 is bent and deformed by energizing the first piezoelectric elements 811 and the second piezoelectric elements 812, the energization is only performed on either side, not on both sides at the same time. However, it is also possible to set a magnitude of the voltage and perform the energization on both sides at the same time.

The abutting portion 82 is a protrusion-like portion at a right end shown in FIG. 3 and protruding in a length direction of the driving source portion 81. The abutting portion 82 is at a boundary position of the first piezoelectric element 811 and the second piezoelectric element 812 on a right side in FIG. 3. The abutting portion 82 is a portion that outputs the deformation of the driving source portion 81 as a force. Therefore, the positional relationship of the abutting portion 82 relative to the driving source portion 81 is not limited thereto this embodiment, and the abutting portion 82 may be on a lateral surface of the driving source portion 81 or may be offset relative to the first piezoelectric element 811 and the second piezoelectric element 812. The abutting portion 82 abuts against an outer peripheral surface of the pushed portion 52 which is made of ceramic and is a portion of the lens unit 5, and moves in a manner of drawing the elliptical trajectories V1 and V2 shown by dotted lines in FIG. 3 according to the deformation of the driving source portion 81.

When the first piezoelectric elements 811 in a shaded upper right region and a shaded lower left region in FIG. 3 are energized, the regions are lengthened in a horizontal direction. When the second piezoelectric elements 812 in a colorless lower right region and a colorless upper left region in FIG. 3 are not energized, the regions maintain rectangular shapes as shown in the figure. Accordingly, the first piezoelectric element 811 is deformed in a direction denoted by an arrow in the figure, and hence the second piezoelectric element 812 is also deformed. As a result, an illustrated right portion of an aggregate of the piezoelectric elements in the driving source portion 81 (an aggregate of the two first piezoelectric elements 811 and the two second piezoelectric elements 812 in this embodiment) is bent and deformed into an inverse U-shape, and an illustrated left portion of the aggregate is bent and deformed into a U-shape, so that the whole is deformed into a horizontal S-shape. Therefore, the abutting portion 82 abutting against the pushed portion 52 moves to a lower right side in FIG. 3. Since the movement takes place while the first piezoelectric elements 811 are lengthened, the abutting portion 82 moves according to an upper right half of the elliptical trajectory V1 shown by the dotted lines on the lower right side of FIG. 3. Further, the lens unit 5 pushed by the abutting portion 82 moves towards a front side of the paper surface in FIG. 1 through a force of the movement. Consequently, in this embodiment, the lens unit 5 can be directly driven by using the third driver 8.

Then, when the first piezoelectric elements 811 in the shaded upper right region and the shaded lower left region are not energized, the regions are shortened in the horizontal direction. The aggregate of the piezoelectric elements in the driving source portion 81 is restored from the horizontal S-shape to an original rectangular shape shown in the figure. At this time, the abutting portion 82 moves to an upper left side in FIG. 3. Since the movement takes place while the first piezoelectric elements 811 are shortened, the abutting portion 82 moves according to a lower left half of the elliptical trajectory V1 shown by the dotted lines in FIG. 3. As described above, the abutting portion 82 draws the elliptical trajectory shown at the lower right side in FIG. 3 by turning on and turning off the power supply to the first piezoelectric elements 811.

In contrast to the above, when the second piezoelectric elements 812 in the colorless lower right region and the colorless upper left region are energized, the aggregate of the piezoelectric elements in the driving source portion 81 is deformed into a "—" shape (or an inverted and horizontal S-shape) opposite to the above, and the abutting portion 82 draws the elliptical trajectory V2 shown in an upper right side of FIG. 3. The lens unit 5 subjected to a force of the movement moves to a rear side of the paper surface of the FIG. 1. In this way, the lens unit 5 is movable in the third direction (the Z direction in this embodiment) according to energizing conditions of the piezoelectric elements 811 and 812 of the third driver 8. With the third driver 8 thus configured, in the camera actuator 1, the third driver 8 becomes compact in the third direction (the Z direction), and a driving force that moves the lens unit 5 in the third direction (the Z direction) can be generated. In addition, a central portion 813 of the aggregate of the four piezoelectric elements 811 and 812 does not move even when the respective piezoelectric elements 811 and 812 are energized. Therefore, for example, when the driving source portion 81 is fixed outside, the driving source portion 81 may be fixed at the central portion 813 as a fixed point. The third driver 8 of this embodiment is fixed to the second moving frame 4 by a fixing component 85 mounted on the central portion 813.

As described above, this embodiment is related to the camera actuator 1. The camera actuator 1 includes: the fixing frame 2; the first moving frame 3 supported by the fixing frame 2 on then inner side of the fixing frame 2 and movable relative to the fixing frame 2 in the first direction; the second moving frame 4 supported by the first moving frame 3 on the inner side of the first moving frame 3 and movable relative to the first moving frame 3 in the second direction orthogonal to the first direction; the lens unit 5 supported by the second moving frame 4 on the inner side of the second moving frame 4 and movable relative to the second moving frame 4 in the third direction orthogonal to the first direction and the second direction; the first driver 6 that extends across the fixing frame 2 and the first moving frame 3 and has the piezoelectric elements lengthened by energization to move the first moving frame 3 in the first direction; the second driver 7 that extends across the first moving frame 3 and the second moving frame 4 and has the piezoelectric elements lengthened by energization to move the second moving frame 4 in the second direction; and the third driver 8 fixed on the second moving frame 4 to move the lens unit 5 in the third direction. The third driver 8 includes the driving source portion 81 and the abutting portion 82. The driving source portion 81 is formed by the first piezoelectric element 811 and the second piezoelectric element 812 that are lengthened by energization and are attached to each other in the direction orthogonal to the lengthening direction. The abutting portion 82 abuts against the lens unit 5 and moves in the manner of drawing the elliptical trajectories V1 and V2 according to the deformation of the driving source portion 81.

According to this configuration, the first driver 6 and the second driver 7 use the piezoelectric elements lengthened by energization as a source of the driving force, and constituent components of the camera actuator 1 will not be enlarged. In addition, the lens unit 5 may be directly driven by using the driving source portion 81 that generates the driving force by the piezoelectric element 811 and the piezoelectric element 812.

In addition, the second moving frame 4 is a polygonal frame, and the third driver 8 may extend along an edge of the polygonal shape of the second moving frame 4.

According to this configuration, since the third driver 8 extends along the edge of the polygonal shape of the second moving frame 4, the third driver 8 becomes compact.

In addition, the third driver 8 may be along the edge of the polygonal shape of the second moving frame 4, and the edge is neither an edge close to the first driver 6 nor an edge close to the second driver 7.

According to this configuration, the third driver 8 may be at an unoccupied position where the first driver 6 and the second driver 7 do not exist.

In addition, the second moving frame 4 is a rectangular or square frame, the lens unit 5 is movable in the third direction by using a third rolling body 51 between the lens unit 5 and the second moving frame 4, and the third rolling body 51 may be at a position closer to an end side than a center of an edge of the rectangular or square shape.

According to this configuration, the structure for moving the lens unit 5 in the third direction becomes compact.

In addition, the third rolling body 51 includes two balls 511 as one group, and the balls 511 of the third rolling body 51 are at symmetrical positions formed by 180° rotation in the second moving frame 4.

According to this configuration, the structure for moving the lens unit 5 in the third direction becomes compact.

In addition, both the first driver 6 and the second driver 7 may include: the driving force generating portion; the rod-shaped portion adjacent to one side of the lengthening-and-shortening direction of the piezoelectric element of the driving force generating portion and extending along the lengthening-and-shortening direction; and the weight portion adjacent to the other side of the lengthening-and-shortening direction of the driving force generating portion.

In addition, the driving force generating portion 61 includes a piezoelectric element 611 lengthened and shortened by energization. When the piezoelectric element 611 is lengthened, a force moving towards a direction of the rod-shaped portion 62 is generated, and the rod-shaped portion 62 is subjected to a pushing force from the driving force generating portion 61. When the piezoelectric element 611 is shortened, a force moving towards a direction of the weight portion 63 is generated, and the rod-shaped portion 62 is subjected to a pulling force from the driving force generating portion 61.

In addition, the third driver 8 is along the edge of the polygonal shape of the second moving frame 4, and the edge is neither an edge close to the first driver 6 nor an edge close to the second driver 7.

In addition, the present disclosure provides a camera module using the camera actuator 1.

In addition, the present disclosure provides an electronic device using the camera actuator 1.

As described above, the constituent components of the camera actuator 1 of this embodiment are not enlarged, and the configuration efficiency of the constituent components is good, realizing a small (thin) camera actuator 1 as a whole. In addition, since the camera actuator 1 does not use magnetic force for driving, no magnetic leakage problem occurs.

What is claimed is:

1. A camera actuator, comprising:
a fixing frame;
a first moving frame supported by the fixing frame on an inner side of the fixing frame, and movable relative to the fixing frame in a first direction;
a second moving frame supported by the first moving frame on an inner side of the first moving frame, and movable relative to the first moving frame in a second direction orthogonal to the first direction;
a lens unit supported by the second moving frame on an inner side of the second moving frame, and movable relative to the second moving frame in a third direction orthogonal to the first direction and the second direction;
a first driver extending across the fixing frame and the first moving frame and having a piezoelectric element lengthened and shortened by energization to move the first moving frame in the first direction;
a second driver extending across the first moving frame and the second moving frame and having a piezoelectric element lengthened and shortened by energization to move the second moving frame in the second direction; and
a third driver fixed on the second moving frame and moving the lens unit in the third direction,
wherein the third driver comprises: a driving source portion formed by a first piezoelectric element and a second piezoelectric element that are lengthened and shortened by energization and attached to each other in a direction orthogonal to a lengthening-and-shortening direction; and an abutting portion abutting against the lens unit, wherein a movement trajectory of the abutting portion according to deformation of the driving source portion is elliptical.

2. The camera actuator according to claim 1, wherein:
the second moving frame is a polygonal frame; and
the third driver extends along an edge of a polygonal shape of the second moving frame.

3. The camera actuator according to claim 2, wherein the third driver is along the edge of the polygonal shape of the second moving frame, and the edge is neither an edge close to the first driver nor an edge close to the second driver.

4. The camera actuator according to claim 1, wherein:
the second moving frame is a rectangular or square frame;
the lens unit is movable in the third direction through a rolling body between the lens unit and the second moving frame; and
the rolling body is at a position closer to an end side than a center of an edge of the rectangular or square shape.

5. The camera actuator according to claim 4, wherein:
the rolling body comprises two balls, and the two balls are at symmetrical positions formed by 180° rotation in the second moving frame.

6. The camera actuator according to claim 1, wherein each of the first driver and the second driver comprises:
a driving force generating portion having the piezoelectric element lengthened and shortened by energization;
a rod-shaped portion adjacent to one side of the lengthening-and-shortening direction of the piezoelectric element and extending along the lengthening-and-shortening direction; and
a weight portion adjacent to another side of the lengthening-and-shortening direction of the piezoelectric element.

7. The camera actuator according to claim 6, wherein:
a force moving towards a direction of the rod-shaped portion is generated during lengthening of the piezoelectric element, and the rod-shaped portion is subjected to a pushing force from the driving force generating portion; and
a force moving towards a direction of the weight portion is generated during shortening of the piezoelectric element, and the rod-shaped portion is subjected to a pulling force from the driving force generating portion.

8. The camera actuator according to claim 6, wherein:
the weight portion has a greater mass than the rod-shaped portion and is made of brass; and
the rod-shaped portion is made of aluminum oxide.

9. The camera actuator according to claim 1, wherein:
the third driver is along an edge of a polygonal shape of the second moving frame, and the edge is neither an edge close to the first driver nor an edge close to the second driver.

10. The camera actuator according to claim 1, wherein:
a first position of the first moving frame relative to the fixing frame in the first direction is detected by a first Hall element and a first permanent magnet; and
a second position of the second moving frame relative to the fixing frame in the second direction is detected by a second Hall element and a second permanent magnet.

11. A camera module, comprising:
a camera actuator comprising:
a fixing frame;
a first moving frame supported by the fixing frame on an inner side of the fixing frame, and movable relative to the fixing frame in a first direction;
a second moving frame supported by the first moving frame on an inner side of the first moving frame, and movable relative to the first moving frame in a second direction orthogonal to the first direction;
a lens unit supported by the second moving frame on an inner side of the second moving frame, and movable relative to the second moving frame in a third direction orthogonal to the first direction and the second direction;
a first driver extending across the fixing frame and the first moving frame and having a piezoelectric element lengthened and shortened by energization to move the first moving frame in the first direction;
a second driver extending across the first moving frame and the second moving frame and having a piezoelectric element lengthened and shortened by energization to move the second moving frame in the second direction; and
a third driver fixed on the second moving frame and moving the lens unit in the third direction,
wherein the third driver comprises: a driving source portion formed by a first piezoelectric element and a second piezoelectric element that are lengthened and shortened by energization and attached to each other in a direction orthogonal to a lengthening-and-shortening direction; and an abutting portion abutting against the lens unit, wherein a movement trajectory of the abutting portion according to deformation of the driving source portion is elliptical.

12. The camera module according to claim 11, wherein the fixing frame, the first moving frame, and the second moving frame have depth dimensions capable of supporting balls in a rotatable manner.

13. The camera module according to claim 11, wherein:
the second moving frame is a polygonal frame; and
the third driver extends along an edge of a polygonal shape of the second moving frame.

14. The camera module according to claim 13, wherein the third driver is along the edge of the polygonal shape of the second moving frame, and the edge is neither an edge close to the first driver nor an edge close to the second driver.

15. The camera module according to claim 11, wherein:
the second moving frame is a rectangular or square frame;
the lens unit is movable in the third direction through a rolling body between the lens unit and the second moving frame; and
the rolling body is at a position closer to an end side than a center of an edge of the rectangular or square shape.

16. The camera module according to claim 15, wherein:
the rolling body comprises two balls, and the two balls are at symmetrical positions formed by 180° rotation in the second moving frame.

17. The camera module according to claim 11, wherein each of the first driver and the second driver comprises:
a driving force generating portion having the piezoelectric element lengthened and shortened by energization;
a rod-shaped portion adjacent to one side of the lengthening-and-shortening direction of the piezoelectric element and extending along the lengthening-and-shortening direction; and
a weight portion adjacent to another side of the lengthening-and-shortening direction of the piezoelectric element.

18. The camera module according to claim 17, wherein:
a force moving towards a direction of the rod-shaped portion is generated during lengthening of the piezoelectric element, and the rod-shaped portion is subjected to a pushing force from the driving force generating portion; and
a force moving towards a direction of the weight portion is generated during shortening of the piezoelectric element, and the rod-shaped portion is subjected to a pulling force from the driving force generating portion.

19. The camera module according to claim 11, wherein:
the third driver is along an edge of a polygonal shape of the second moving frame, and the edge is neither an edge close to the first driver nor an edge close to the second driver.

20. An electronic device, comprising:
a camera actuator comprising:
a fixing frame;
a first moving frame movable relative to the fixing frame in a first direction;
a second moving frame movable relative to the first moving frame in a second direction orthogonal to the first direction;
a lens unit supported by the second moving frame on an inner side of the second moving frame, and movable relative to the second moving frame in a third direction orthogonal to the first direction and the second direction;
a first driver extending across the fixing frame and the first moving frame and having a piezoelectric element lengthened and shortened by energization to move the first moving frame in the first direction;
a second driver extending across the first moving frame and the second moving frame and having a piezoelectric element lengthened and shortened by energization to move the second moving frame in the second direction; and
a third driver fixed on the second moving frame and moving the lens unit in the third direction, wherein:
the fixing frame, the first moving frame, and the second moving frame are in an embedded configuration; and
the third driver comprises: a driving source portion formed by a first piezoelectric element and a second piezoelectric element that are lengthened and shortened by energization and attached to each other in a direction orthogonal to a lengthening-and-shortening direction; and an abutting portion abutting against the lens unit, wherein a movement trajectory of the abutting portion according to deformation of the driving source portion is elliptical.

* * * * *